United States Patent
Gwon

(10) Patent No.: US 8,550,492 B2
(45) Date of Patent: Oct. 8, 2013

(54) SIDE AIRBAG MODULE

(75) Inventor: Tae-Ik Gwon, Gongju-si (KR)

(73) Assignee: Autoliv Development AB, Vargarda (SE)

(*) Notice: Subject to any disclaimer, the term of this patent is extended or adjusted under 35 U.S.C. 154(b) by 0 days.

(21) Appl. No.: 13/128,006

(22) PCT Filed: Nov. 23, 2009

(86) PCT No.: PCT/KR2009/006884
§ 371 (c)(1),
(2), (4) Date: May 6, 2011

(87) PCT Pub. No.: WO2010/059002
PCT Pub. Date: May 27, 2010

(65) Prior Publication Data
US 2011/0248485 A1    Oct. 13, 2011

(30) Foreign Application Priority Data
Nov. 21, 2008   (KR) .................... 10-2008-0116390

(51) Int. Cl.
*B60R 21/207* (2006.01)
*B60R 21/233* (2006.01)
*B60R 21/239* (2006.01)

(52) U.S. Cl.
USPC ................ 280/729; 280/730.2; 280/739

(58) Field of Classification Search
USPC ................................ 280/729, 730.2, 739
See application file for complete search history.

(56) References Cited

U.S. PATENT DOCUMENTS

| 3,642,303 A | | 2/1972 | Irish et al. | |
| 5,718,450 A | * | 2/1998 | Hurford et al. | 280/730.2 |
| 5,848,804 A | * | 12/1998 | White et al. | 280/743.1 |
| 5,927,748 A | * | 7/1999 | O'Driscoll | 280/729 |
| 6,419,267 B1 | * | 7/2002 | Hashimoto et al. | 280/743.1 |
| 6,439,605 B2 | * | 8/2002 | Ariyoshi | 280/739 |

(Continued)

FOREIGN PATENT DOCUMENTS

| EP | 1 026 048 A2 | 8/2000 |
| JP | 2002-019568 A | 1/2002 |

(Continued)

OTHER PUBLICATIONS

Ex parte Hideo Matsunaga et al., Appeal No. 2009-014954, U.S. Appl. No. 10/802,874 (BPAI Jan. 24, 2012).*

(Continued)

*Primary Examiner* — Joseph Rocca
(74) *Attorney, Agent, or Firm* — Ladas & Parry LLP

(57) ABSTRACT

Provided is a side airbag module, including (i) a gas generating means generating a hot and high-pressure gas and exhausting the gas through an outlet when a car collision occur, (ii) a side airbag cushion that is configured to be filled with the exhausted gas and is inflated from back to front at a side of a passenger, and (iii) a baffle which includes a first vent hole and is formed inside the side airbag cushion to divide the inner space of the side airbag cushion into an inner chamber and an outer chamber, wherein a second vent hole is formed in a portion of the side airbag cushion, the portion corresponding to the outer chamber, and the inner chamber is inflated first and the outer chamber is inflated later as the side airbag cushion is inflated from back to front at a side of the passenger.

4 Claims, 4 Drawing Sheets

(56) References Cited

U.S. PATENT DOCUMENTS

| | | | |
|---|---|---|---|
| 6,554,313 B2 * | 4/2003 | Uchida | 280/729 |
| 7,338,070 B2 * | 3/2008 | Madasamy et al. | 280/730.2 |
| 7,766,379 B2 * | 8/2010 | Dix et al. | 280/730.2 |
| 7,770,921 B2 * | 8/2010 | Mueller et al. | 280/739 |
| 2004/0032116 A1 * | 2/2004 | Steinbruck et al. | 280/730.2 |
| 2004/0119269 A1 | 6/2004 | Yokota et al. | |
| 2005/0006883 A1 * | 1/2005 | Sato et al. | 280/730.2 |
| 2008/0106128 A1 * | 5/2008 | Kashiwagi | 297/216.1 |
| 2011/0057427 A1 * | 3/2011 | Cho et al. | 280/736 |

FOREIGN PATENT DOCUMENTS

| | | |
|---|---|---|
| JP | 2003-034208 A | 2/2003 |
| KR | 1020000041782 A | 7/2000 |
| KR | 1020050082322 A | 8/2005 |
| WO | 2008/006350 A2 | 1/2008 |
| WO | WO 2008122346 A1 * | 10/2008 |

OTHER PUBLICATIONS

Ex parte Hideo Wantabe, Appeal No. 2010-002928, U.S. Appl. No. 11/637,837 (BPAI Sep. 27, 2012).*

Dimension n ((MEASUREMENT))—definition in Cambridge American English Dictionary, available at, http://dictionary.cambridge.org/dictionary/american-english/dimension_1 (last visited Oct. 9, 2012).*

Ex parte Brian T. Purcell et al., Appeal No. 2008-004765, U.S. Appl. No. 11/200,670 (BPAI, Jun. 3, 2009).*

Ex parte Lee Atkinson, Appeal No. 2009-008474, U.S. Appl. No. 11/263,356 (BPAI, Dec. 8, 2009).*

European Search Report; dated Dec. 3, 2012; Appln. No. EP 09 82 7767.

International Search Report: mailed Jul. 2, 2010; PCT/KR2009/006884.

* cited by examiner

SIDE AIRBAG MODULE

TECHNICAL FIELD

The present invention relates to a side airbag module, and more particularly, to a side airbag module which can prevent clogging of vent holes formed to improve shock-absorbency of an inflated airbag cushion, and/or can prevent a passenger from getting burned by hot gas exhausted through the vent holes.

BACKGROUND ART

Car airbag modules absorb shocks when a passenger on a car collides against the interior of the car in case of a car accident. Car airbag modules can be divided into two types: front airbag modules installed in front of a passenger seat and side airbag modules installed in a side of a passenger seat. The side airbag module is inflated between a passenger and a vehicle door.

DISCLOSURE OF INVENTION

Technical Problem

When a collision occurs, a hot and high-pressure gas inflates an airbag cushion almost instantly. Thus, a passenger may be injured by the airbag cushion. To prevent such injury, vent holes through which gas injected into an airbag cushion can be exhausted may be formed in the airbag cushion. Cross sections and locations of such vent holes may affect the effectiveness of an airbag cushion. Especially, if the vent holes are temporarily blocked by a passenger or a vehicle door trim, the shock-absorbency efficiency of the inflated airbag cushion decreases, and thus a passenger may be injured.

Solution to Problem

According to an aspect of the present invention, there is provided a side airbag module including (i) a gas generating means for generating a hot and high-pressure gas and exhausting the gas through an outlet when a car collision occurs, (ii) a side airbag cushion that is configured to be filled with the exhausted gas and is inflated from back to front at a side of a passenger, and (iii) a baffle which includes a first vent hole and is formed inside the side airbag cushion to divide the inner space of the side airbag cushion into an inner chamber and an outer chamber, wherein a second vent hole is formed in a portion of the side airbag cushion, the portion corresponding to the outer chamber, and the inner chamber is inflated first and the outer chamber is inflated later as the side airbag cushion is inflated from back to front at a side of the passenger. The volume of the inner chamber is greater than that of the outer chamber.

The first vent hole, through which the hot and high-pressure gas rapidly injected into the inner chamber inflated to protect a side of a passenger is exhausted, is formed not to be exposed outside the side airbag cushion. Thus, the first vent hole cannot be blocked as the side airbag cushion is inflated, and a passenger will not be injured by the hot gas. Thus, the first vent hole may be formed at a location maximizing the shock-absorbency efficiency of the side airbag cushion. Therefore, passenger's safety can be maximized.

The baffle may be positioned such that the inner chamber is positioned close to the gas generating means and the outer chamber is positioned far from the gas generating means when the side airbag cushion is inflated. Especially, the baffle may be positioned almost perpendicular to ground. In other words, the inner chamber is inflated sufficiently to protect the upper-side and lower-side portions of a passenger.

The overall cross-section of the second vent hole is greater than that of the first vent hole. Furthermore, the overall cross-section of the second vent hole with respect to that of the first vent hole may be determined to be within a range capable of preventing gas exhausted from the inner chamber to the outer chamber from flowing back to the inner chamber.

The vertical location of the second vent hole with respect to the ground when the side airbag cushion is inflated may be different from that of the first vent hole.

Advantageous Effects of Invention

According to the invention, vent holes of side airbag module are prevented from clogging or a passenger is prevented from getting burned by hot gas exhausted through the vent holes.

BRIEF DESCRIPTION OF DRAWINGS

The above and other features and advantages of the present invention will become more apparent by describing in detail exemplary embodiments thereof with reference to the attached drawings in which.

BEST MODE FOR CARRYING OUT THE INVENTION

Preferred embodiments of the present invention will now be described with reference to the attached drawings.

Figure 1:
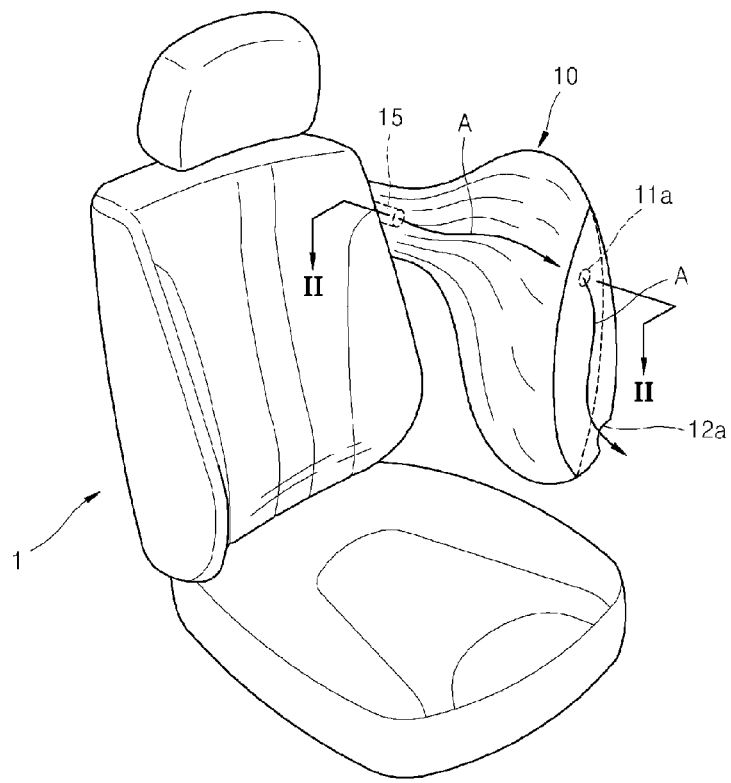
FIG. 1 is an oblique view of a side airbag module in an inflated state, according to an embodiment of the present invention.

FIG. 1 is an oblique view of a side airbag module in an inflated state, according to an embodiment of the present invention. The side airbag module includes a gas generating means 15, a side airbag cushion 10, and a baffle 13. Although not shown in FIG. 1, the side airbag module may further include a housing.

The housing (not shown) may be fixed on a side of a passenger seat, and more particularly, on a side of a backrest of a passenger seat 1. However, the present invention is not limited thereto, and the housing may be fixed to various locations. The side airbag cushion 10 is housed in the housing.

The gas generating means 15 may be attached behind the housing. When a shock exceeding a predetermined amplitude occurs, a hot and high-pressure gas is exhausted through an outlet from the gas generating means 15. Although the gas generating means 15 may be housed in the housing, the present invention is not limited thereto. Although not shown in FIG. 1, a cover may be attached in front of the housing to house the airbag cushion 10 and the gas generating measure 15 together with the housing. However, it is not necessary for the gas generating to be housed by the cover and the housing.

The side airbag cushion 10 is connected to the housing. When a car collision occurs, the hot and high-pressure gas generated by the gas generating means 15 is exhausted through the outlet, and the gas fills the side airbag cushion. Thus, the side airbag cushion 10 is inflated mainly from back to front at a side of a passenger. The side airbag cushion 10 may be made of a fabric. Normally, the side airbag cushion 10 is housed within the housing in a predetermined shape. When a car collision occurs, the cover is removed and the side airbag cushion 10 is inflated frontward by the hot and high-pressure gas exhausted through the outlet in order to protect the side part of a passenger. Although the side airbag cushion 10 is generally housed folded inside the housing, the present invention is not limited thereto, and the side airbag cushion 10 may also be folded in various ways.

Figure 2:
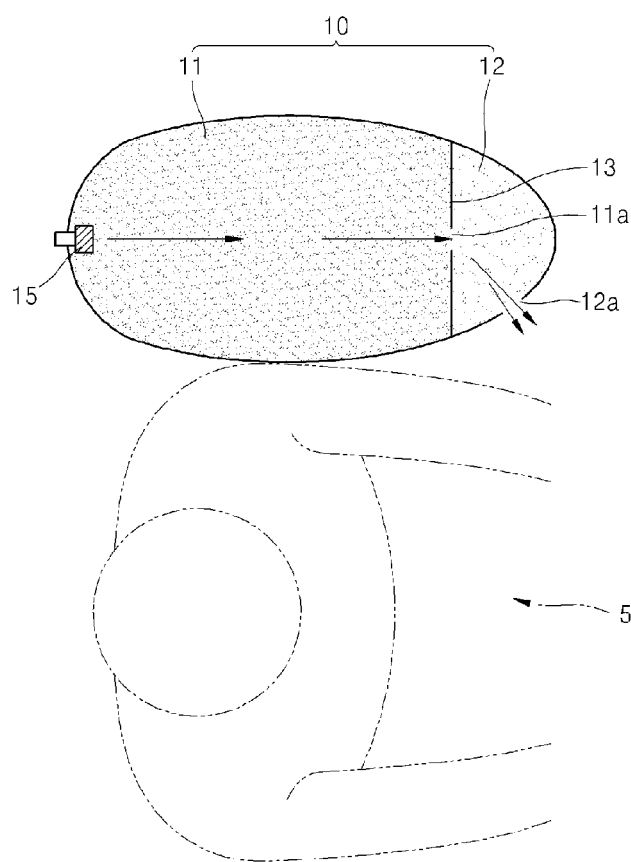
FIG. 2 is a sectional view taken along line II-II of FIG. 1.

FIG. 2 is a sectional view taken line II-II of FIG. 1. The side airbag cushion 10 is divided into an inner chamber 11 and an outer chamber 12 by the baffle 13. If the baffle 13 is not used, the side airbag cushion 10 according to the current embodiment includes only one chamber. In contrast, an independent cushion may form the outer chamber 12, and another independent cushion may form the inner chamber 11. The latter approach, however, is not preferable due to increased costs and complexity of fabrication method. Thus, as compared to a conventional method of fabricating an airbag cushion, when the inner chamber 11 and the outer chamber 12 are formed as cushions independent from each other as in the current embodiment the fabrication method is less expensive and simpler, and also the inflation features are better since only one cushion is inflated.

A first vent hole 11a is formed in the baffle 13. The first vent hole 11a allows the hot and high-pressure gas generated by the gas generating means 15 to be exhausted to the outer chamber 12 after inflating the inner chamber 11. Thus, the shock-absorbency efficiency of the inner chamber 11 is improved, and the possible of injury to a passenger is reduced.

The outer chamber 12 and the inner chamber 11 are arranged such that the entire side airbag cushion 10 inflates mainly from back to front at a side of a passenger. In other words, when the side airbag cushion 10 is completely inflated, the outer chamber 12 is located ahead of the inner chamber 11. In this case not the entire outer chamber 12 is located ahead of the entire inner chamber 11, but at least a portion of the outer chamber 12 is located at the foremost location of the side airbag cushion 10. The baffle 13 is installed within the side airbag cushion 10 so that the outer chamber 12 is ahead of the inner chamber 11.

In the embodiment shown in FIG. 2, when the side airbag cushion 10 is completely inflated, the baffle 13 is moved inside the side airbag cushion 10 and is positioned almost perpendicular to ground so that most of the outer chamber 12 is located ahead of the inner chamber 11. However, the present invention is not limited thereto, and the baffle 13 may be positioned in various ways. For example, other than a case in which the baffle 13 is positioned perpendicular to the ground, the baffle 13 may be positioned at various angles, such as 80°, 70°, 60°, and even 50°, with respect to ground. Furthermore, unlike the embodiment shown in FIG. 1, the baffle 13 may be formed to have curved surfaces.

Figure 3:
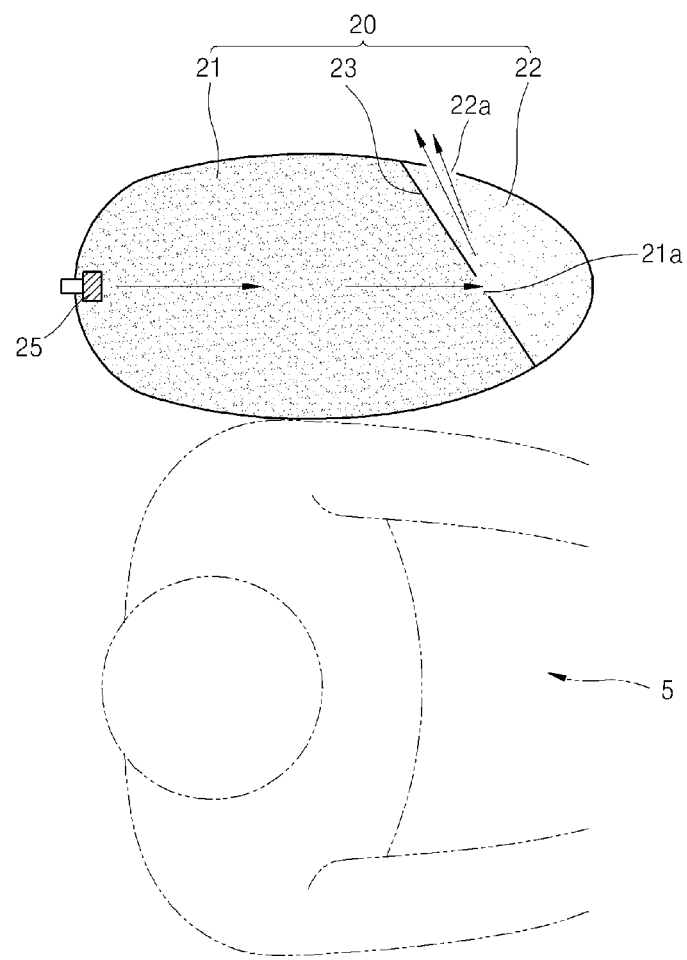
FIG. 3 is a sectional view as in FIG. 1 of a side airbag module in an inflated state, according to another embodiment of the present invention.
Figure 4:
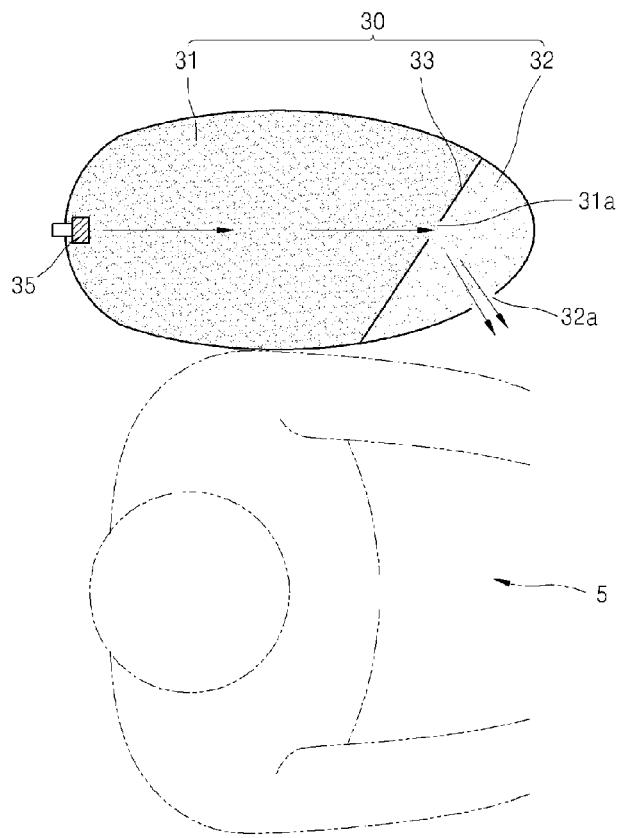
FIG. 4 is a sectional view as in FIG. 1 of a side airbag module in an inflated state, according to yet another embodiment of the present invention.
Figure 5:
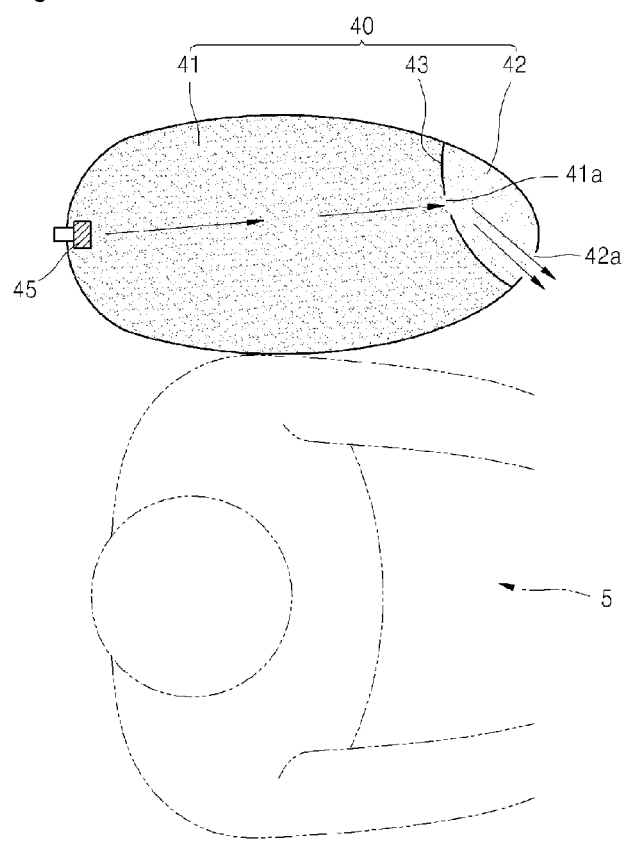
FIG. 5 is a sectional view as in FIG. 1 of a side airbag module in an inflated state, according to yet another embodiment of the present invention.

Similarly, when a side airbag cushion (10) is viewed from above, a baffle (13) may be positioned in various ways as shown in FIGS. 3 through 5. Especially, as shown in the embodiment of FIG. 5, the baffle (13) may be formed to have curved surfaces.

The baffle 13 may be formed of the same material as the side airbag cushion 10; i.e., a fabric. However, the present invention is not limited thereto, and the baffle 13 may be formed of various materials.

The first vent hole 11a is formed in a portion of the baffle 13. Especially, the location of the first vent hole 11a, and more particularly, the vertical location of the first vent hole 11a with respect to the ground, may be determined so that the hot and high-pressure gas, which is rapidly injected into the inner chamber 11, completely inflates the inner chamber 11 and is exhausted through the first vent hole 11a to maximize the shock-absorbency efficiency of the side airbag cushion 10. The cross-section of the first vent hole 11a with respect to ground may be determined such that hot and high-pressure gas, which is rapidly injected into the inner chamber 11, completely inflates the inner chamber 11 and is exhausted through the first vent hole 11a to maximize the shock-absorbency efficiency of the side airbag cushion 10. Although only one first vent hole 11a is shown in the embodiment of FIGS. 1 and 2, the present invention is not limited thereto, and the two, three, or more first vent hole may be formed. If a plurality of the first vent hole are formed, the cross-section of each of the first vent holes will be smaller.

The inventor of the present application has determined that, if a vent hole is formed at a location supposedly maximizing the shock-absorbency efficiency of the side airbag cushion 10, the shock-absorbency efficiency of the side airbag cushion 10 actually decreases because the vent hole is often blocked by an arm of a passenger or a vehicle door trim. Thus, the inventor has concluded that this problem may be solved by forming the first vent hole 11a of the inner chamber 11 not to be exposed outside the side airbag cushion 10, when the inner chamber 11 occupies most of the side airbag cushion 10. In this case, the size of the inner chamber 11 is determined to be sufficiently large so that the inner chamber 11 can protect a side of a passenger. Thus, the first vent hole 11a may be formed at a location maximizing the shock-absorbency efficiency of the side airbag cushion 10 without worrying that the first vent hole 11a is blocked by an arm of a passenger or a vehicle door trim. Therefore, the passenger safety can be maximized.

The hot and high-pressure gas generated by the gas generating means 15 inflates the outer chamber 12 by being exhausted through the first vent hole 11a after the inner chamber 11 is completely inflated. In other words, the inner chamber 11 of the side airbag cushion 10 is deployed first, and the outer chamber 12 is deployed later. Thus, the side airbag cushion 10 is inflated from back to front at a side of a passenger.

Figure 6:
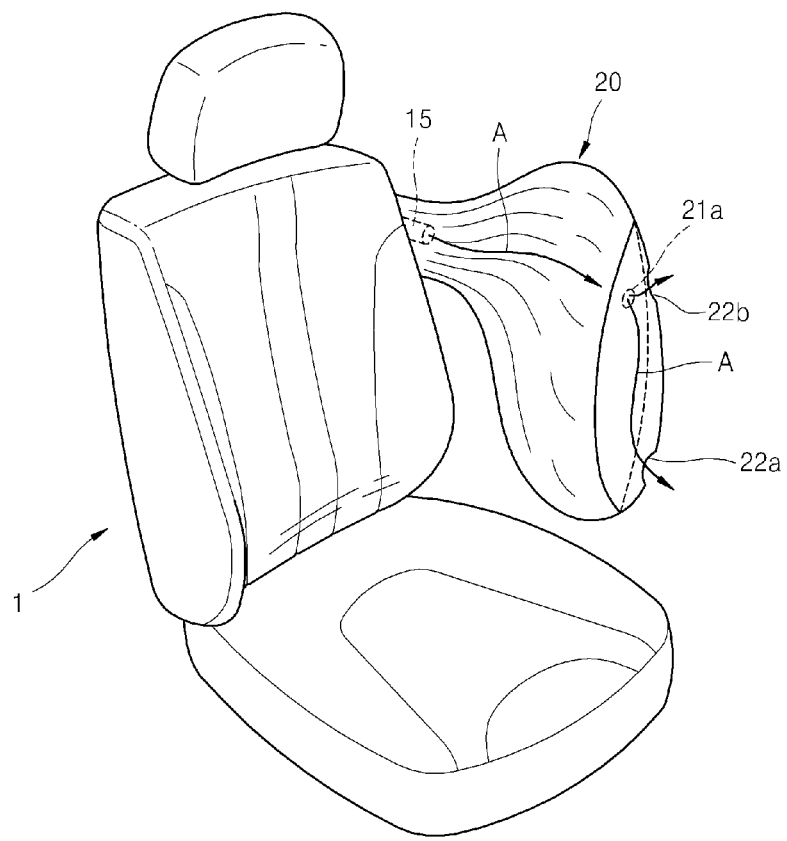
FIG. 6 is an oblique view of a side airbag module in an inflated state, according to yet another embodiment of the present invention.

A second vent hole 12a is formed in a portion of the outer chamber 12. The second vent hole 12a allows the gas injected into the outer chamber 12 through the first vent hole 11a to be exhausted outside, thereby increasing the shock-absorbency efficiency of the side airbag cushion 10. As shown in FIG. 1, one second vent hole 12a may be formed. Furthermore, as shown in FIG. 6, two second vent holes 22a and 22b may be formed. However, the present invention is not limited thereto, and three or more second vent holes may be formed. However, in any case, the overall cross-section of second vent holes must be greater than the overall cross-section of first vent holes in order to prevent the gas which is once exhausted from the inner chamber 11 to the outer chamber 12 through the first vent hole 11a from flowing back to the inner chamber 11. Therefore, the overall cross-section of the second vent hole(s) 12a or 22a and 22b may be determined to be within a range capable of preventing the gas exhausted from the inner chamber 11 to the outer chamber 12 from flowing back to the inner chamber 11.

Furthermore, when the side airbag cushion 10 is inflated, the vertical location of the second vent hole 12a with respect to ground may be different from that of the first vent hole 11a. In other words, the possibility that the second vent hole 12a is blocked by an arm of a passenger may be reduced by forming the second vent hole 12a to have a vertical location with respect to ground either lower or higher than that of the first vent hole 11a. However, the present invention is not limited thereto. For example, even if the vertical locations of the second vent hole 12a and the first vent hole 11a with respect to ground are similar, the horizontal location of the second vent hole 12a may be a location where the second vent hole 12a will not be blocked by an arm of a passenger or a vehicle door trim.

While the present invention has been particularly shown and described with reference to exemplary embodiments thereof, it will be understood by those of ordinary skill in the art that various changes in form and details may be made therein without departing from the spirit and scope of the present invention as defined by the following claims.

MODE FOR THE INVENTION

Embodiments illustrated in FIGS. 3 through 5 are also possible. Referring to FIGS. 3 through 5, when a side airbag cushion (10) is viewed from above, a baffle (13) may be positioned in various ways. Especially, as shown in the embodiment of FIG. 5, the baffle (13) may be formed to have curved surfaces.

INDUSTRIAL APPLICABILITY

The present invention can be used in industrial areas of manufacturing or using the airbag module.

The invention claimed is:

1. A side airbag module comprising:
  a gas generating means for generating a hot and high-pressure gas and injecting the gas through an outlet when a car collision occurs;
  a side airbag cushion that is configured to be filled with the injected gas and is inflated mainly from back to front at a side of a passenger; and
  a baffle which includes at least one first vent hole and is formed inside the side airbag cushion to divide the inner space of the side airbag cushion into an inner chamber and an outer chamber, wherein, when the side airbag cushion is completely inflated, the baffle is positioned substantially perpendicular to ground so that most of the outer chamber is located ahead of the inner chamber,
  wherein a plurality of second vent holes is formed in a portion of the side airbag cushion, the portion corresponding to the outer chamber, and the inner chamber is inflated first and the outer chamber is inflated later as the side airbag cushion is inflated mainly from back to front at a side of the passenger,
  wherein the overall cross-section of at least one of the second vent holes is greater than that of the at least one first vent hole,
  wherein the number of the second vent holes is greater than the number of the at least one first vent hole, and wherein at least one of the second vent holes' vertical location with respect to the ground is lower than the at least one first vent hole's vertical location and another one of the second vent holes' vertical location with respect to the ground is higher than the first vent hole's vertical location.

2. The side airbag module of claim 1, wherein, when the side airbag cushion is inflated, the baffle is positioned such that the inner chamber is positioned close to the gas generating means and the outer chamber is positioned far from the gas generating means.

3. The side airbag module of claim 1, wherein the volume of the inner chamber is greater than that of the outer chamber.

4. The side airbag module of claim 1, wherein the overall cross-section of the second vent hole with respect to that of the first vent hole is determined within a range capable of preventing the gas exhausted from the inner chamber to the outer chamber from flowing back to the inner chamber.

* * * * *